(12) United States Patent
Dumanski et al.

(10) Patent No.: US 9,927,018 B2
(45) Date of Patent: Mar. 27, 2018

(54) GEAR ASSEMBLY

(71) Applicants: Miba Sinter Austria GmbH, Laakirchen (AT); Metaldyne International Deutschland GmbH, Dieburg (DE)

(72) Inventors: Christian Dumanski, Plesching-Steyregg (AT); Wolfgang Siessl, Traunkirchen (AT); Alexander Mueller, Altmuenster (AT); Karl Dickinger, Vorchdorf (AT); Juergen Depp, Michelstadt (DE)

(73) Assignees: Miba Sinter Austria GmbH, Laakirchen (AT); Metaldyne International Deutschland GmbH, Dieburg (DE)

( * ) Notice: Subject to any disclaimer, the term of this patent is extended or adjusted under 35 U.S.C. 154(b) by 0 days.

(21) Appl. No.: 15/271,617

(22) Filed: Sep. 21, 2016

(65) Prior Publication Data

US 2017/0097083 A1   Apr. 6, 2017

(30) Foreign Application Priority Data

Oct. 6, 2015   (AT) .................................. 50852/2015

(51) Int. Cl.
*F16H 55/18* (2006.01)
*F16H 57/00* (2012.01)
*F16H 1/20* (2006.01)

(52) U.S. Cl.
CPC ........... *F16H 57/0006* (2013.01); *F16H 1/20* (2013.01); *F16H 55/18* (2013.01); *F16H 2057/0012* (2013.01)

(58) Field of Classification Search
CPC ..... F16H 57/12; F16H 55/18; F16H 2057/126
See application file for complete search history.

(56) References Cited

U.S. PATENT DOCUMENTS 2,061,684 A * 11/1936 Spence, Jr. ............. F16H 55/18
74/440
2,845,809 A * 8/1958 Hetzel .................... F16H 55/18
29/463

(Continued)

FOREIGN PATENT DOCUMENTS

AT          514590 B1      2/2015
DE       38 03 700 A1      8/1989

(Continued)

*Primary Examiner* — Zakaria Elahmadi
(74) *Attorney, Agent, or Firm* — Collard & Roe, P.C.

(57) ABSTRACT

The invention relates to a gear assembly (12) comprising a fixed gear (13) having a first radial toothing (16) and an idler (14) having a second radial toothing (17), the first radial toothing (16) being disposed at least approximately at the same radial height as the second radial toothing (17), and the fixed gear (13) further comprises a first axial end face (18) and the idler (14) comprises a second axial end face (19), and the fixed gear (13) is connected to the idler (14) by means of at least one elastic connecting element (21), for which purpose the elastic connecting element (21) is connected on the one hand to the first axial end face (18) of the fixed gear (13) and on the other hand to the second axial end face (19) of the idler (14).

7 Claims, 1 Drawing Sheet

(56) References Cited

U.S. PATENT DOCUMENTS

| | | | | |
|---|---|---|---|---|
| 3,174,356 A * | 3/1965 | Michalec | F16H 55/18 74/409 |
| 4,660,432 A * | 4/1987 | Damas | F16H 55/18 464/85 |
| 4,700,582 A * | 10/1987 | Bessette | F16H 55/14 74/409 |
| 5,813,335 A | 9/1998 | Burke | B41F 13/012 101/177 |
| 6,354,395 B1 * | 3/2002 | Cheng | B62D 5/0409 180/444 |
| 6,615,683 B1 * | 9/2003 | Voigt | F16H 55/18 74/395 |
| 8,621,951 B2 * | 1/2014 | Meier | F16D 1/116 74/409 |
| 9,010,209 B2 * | 4/2015 | Murphy | F16H 55/18 123/90.31 |
| 2002/0121152 A1 * | 9/2002 | White | F16H 55/18 74/445 |
| 2004/0200302 A1 * | 10/2004 | Kampichler | F16H 55/18 74/409 |
| 2010/0050799 A1 * | 3/2010 | Brackney | F16H 55/18 74/409 |
| 2010/0139431 A1 * | 6/2010 | Park | F16H 55/18 74/409 |
| 2010/0242649 A1 * | 9/2010 | Vandewal | F16H 55/18 74/409 |
| 2010/0326223 A1 * | 12/2010 | Lang | F16H 55/14 74/409 |
| 2011/0030489 A1 * | 2/2011 | Chen | F16H 55/18 74/409 |
| 2013/0112027 A1 * | 5/2013 | Buchleitner | F16H 55/18 74/440 |
| 2013/0199323 A1 * | 8/2013 | Fong | F16H 55/18 74/409 |
| 2014/0190442 A1 * | 7/2014 | Saito | F16H 55/18 123/192.2 |
| 2014/0216190 A1 * | 8/2014 | Dickinger | F16H 55/18 74/409 |
| 2014/0224053 A1 * | 8/2014 | Buchleitner | F16H 55/17 74/445 |
| 2014/0360297 A1 * | 12/2014 | Yamauchi | F16H 57/12 74/409 |
| 2014/0360300 A1 * | 12/2014 | Viechtbauer | F16H 55/18 74/445 |
| 2015/0053031 A1 * | 2/2015 | Willcox | F16H 1/20 74/409 |
| 2015/0226304 A1 * | 8/2015 | Dumanski | F16H 55/17 74/440 |
| 2015/0316135 A1 * | 11/2015 | Schnolzer | F16H 55/18 74/440 |
| 2015/0316136 A1 * | 11/2015 | Schnolzer | F16H 55/18 74/409 |
| 2016/0033030 A1 * | 2/2016 | Palfai | F16H 57/12 74/409 |
| 2016/0138697 A1 * | 5/2016 | Kancherla | F16H 57/0006 74/409 |

FOREIGN PATENT DOCUMENTS

| | | | | |
|---|---|---|---|---|
| DE | 197 50 286 A1 | 5/1999 | | |
| DE | 10 2009 001 403 B3 | 8/2010 | | |
| DE | 10 2010 029 097 B3 | 7/2011 | | |
| GB | 560 469 A | 4/1944 | | |
| JP | S64-36755 U | 3/1989 | | |
| JP | H04-300438 A | 10/1992 | | |
| JP | H08-177977 A | 7/1996 | | |
| WO | WO 2005090829 A1 * | 9/2005 | | F16H 55/18 |
| WO | 2013/189916 A1 | 12/2013 | | |

\* cited by examiner

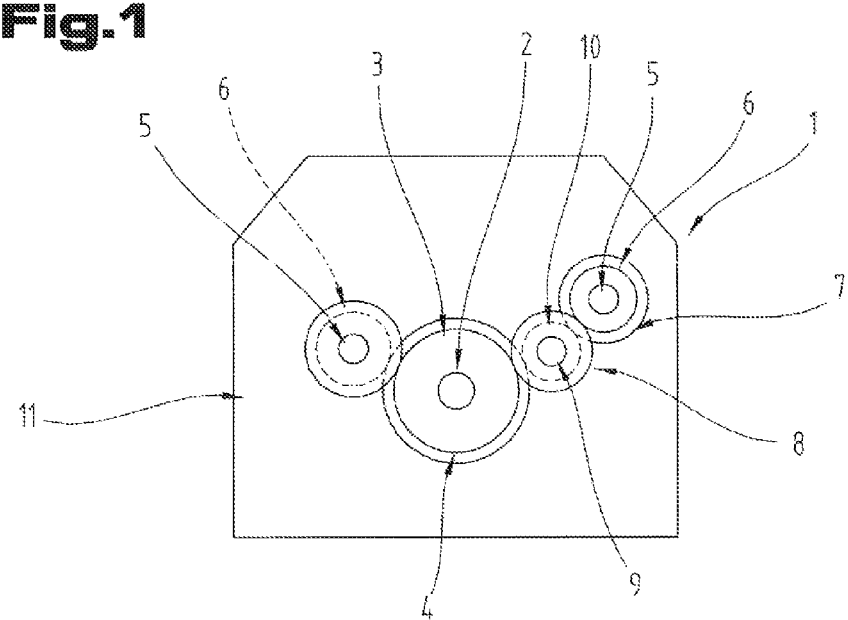
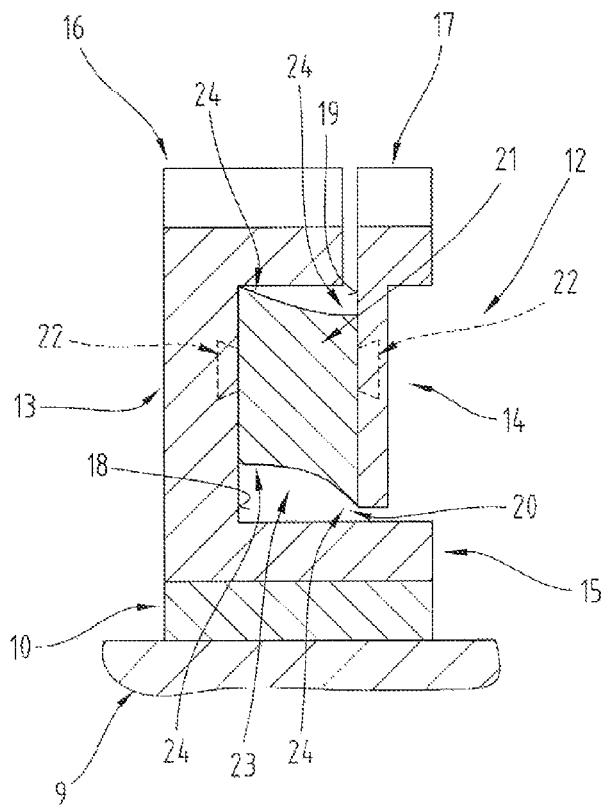
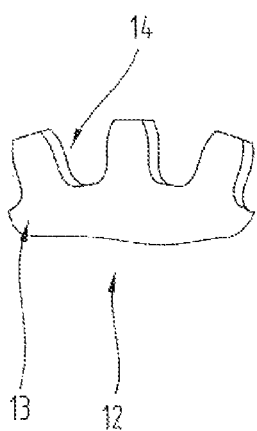

GEAR ASSEMBLY

CROSS REFERENCE TO RELATED APPLICATIONS

Applicants claim priority under 35 U.S.C. § 119 of Austrian Application No. A 50852/2015 filed on Oct. 6, 2015, the disclosure of which is incorporated by reference.

The invention relates to a gear assembly comprising a fixed gear having a first radial toothing and an idler having a second radial toothing, the first radial toothing being disposed at least approximately at the same radial height as the second radial toothing, and the fixed gear further comprises a first axial end face and the idler comprises a second axial end face.

The invention further relates to a gear drive comprising a crankshaft having a first gear and a balance shaft having a second gear, an idler gear being disposed between the first gear and the second gear which meshes with the first and the second gear.

Balance shafts are used in a known manner in internal combustion engines as a means of reducing vibrations caused by free inertial forces and inertial torques. The balance shaft is usually driven by the crankshaft, for which purpose the latter is operatively connected to the former via a gear. With a view to reducing the noise generated between the balance shaft and crankshaft due to the mutually meshing teeth as well as to damp vibrations, split gears (also referred to as decoupled gears) are known from the prior art where the two parts are connected via a rubber elastic connecting element (also known as a rubber track or sleeve spring). For further details, reference may be made to AT 514 590 B1 filed by this applicant and the prior art cited therein.

To enable the crankshaft gear and the balance shaft gear to rotate in the same direction, a so-called idler gear is fitted between these two which meshes with both the crankshaft gear and the balance shaft gear. Since it is not necessary for the idler gear to be provided with a separate shaft, a stationary shaft can be used, on which the idler gear is mounted so as to rotate.

To reduce noise generated by the meshing teeth, it is desirable for not only the gear on the balance shaft to be decoupled within the meaning outlined above, but also the idler gear.

There are also various designs of gear drives known from the prior art. For example, WO 20131189916 A1 describes a spur gear having at least two fixed gears mounted in a housing which are drivingly connected to one another via at least one idler gear mounted in an oscillating manner, and the idler gear meshes with at least one fixed gear and is pressed against the fixed gear in a pressing direction by means of at least one preferably elastic, idler element. Vibrations are thus decoupled in order to damp peaks of the driving torques in the event of rotational irregularities.

The objective of this invention is to configure the idler gear so that it can be universally used in a gear drive. In particular, the objective of the invention is to improve noise reduction in a gear drive having a crankshaft and balance shaft.

The objective of the invention is achieved on the basis of the aforementioned gear assembly in which the fixed gear is connected to the idler by means of at least one elastic connecting element, for which purpose the elastic connecting element is connected on the one hand to the first axial end face of the fixed gear and on the other hand to the second axial end face of the idler.

The objective of the invention is also achieved on the basis of the aforementioned gear drive in which the idler gear is a gear assembly according to one of the preceding claims having a fixed gear and an idler.

The advantage of this is that based on this design of the idler gear, it is possible for the elastic connecting element to be selectively disposed in the torque flow or not.

Based on a design of idler gear with decoupling via a sleeve spring connected to radial end faces of the hub part and gear rim part and having a non-split gear rim, such as known from the prior art described above, the gear rim of the idler gear would simultaneously mesh with the toothing of the crankshaft gear and the toothing of the balance gear against which it is radially disposed. The gear rim thus assumes an eccentric position due to the two gears simultaneously meshing with the idler gear, especially if the balance shaft gear is also decoupled. The rebounding force is supplied by the sleeve spring. The torque does not flow through the elastic connecting element but would be transmitted from the crankshaft gear to the idler gear and from there to the balance shaft gear purely via the teeth, i.e. the elastic connecting element of the gear assembly does not lie in the torque flow. Only the very low dynamic torque between the hub and gear rim of the idler gear and the small static torque due to bearing friction would pass via the sleeve spring. The resultant sheer and tensile stresses lead to a high mechanical load on the sleeve spring.

By splitting toothing of the idler gear between the toothing of the idler and the toothing of the fixed gear, it is possible for the toothing of the idler to mesh exclusively with the toothing of the first gear of the crankshaft and be positioned radially against the latter and for the toothing of the fixed gear to mesh exclusively with the toothing of the second gear of the balance shaft. The torque therefore passes—put simply—from the crankshaft to the idler, from there via the elastic connecting element to the fixed gear and from there to the balance shaft. The gear on the balance shaft is also a decoupled gear in particular. This embodiment of the idler gear makes it easier to obtain an eccentric position of the idler gear part-toothing relative to the stationary axle or the bearing by means of which the idler gear is mounted on the stationary axle. As a result of the low radial stiffness due to the elastic connecting element, the gear assembly can be more easily positioned against the two gears meshing with it.

In addition to this embodiment of the idler gear, however, there is also another option whereby the toothing of the fixed gear and the toothing of the idler simultaneously mesh with the toothing of the first gear of the crankshaft and the toothing of the second gear of the balance shaft. In this case, the toothing of the fixed gear can be biased against the toothing of the idler, as will be explained in more detail below. Again in this case, a reduction in noise can be achieved because the tooth flank clearance of the meshing teeth is reduced.

To further improve these effects based on a preferred embodiment of the gear assembly, the elastic connecting element is disposed exclusively between the first axial end face of the fixed gear and the second axial end face of the idler and is connected exclusively to these axial end faces.

Furthermore, the first axial end face of the fixed gear may be disposed in a recess of the fixed gear and/or the second axial end face of the idler is disposed in a recess of the idler. As a result, the elastic connecting element may be at least partially disposed inside the fixed gear and/or the idler, thereby enabling the axial length of the gear assembly to be reduced.

The elastic connecting element is preferably made at least partially from a rubber elastic material and it is particularly preferable if it is made entirely from a rubber elastic material. This more effectively enables the radial stiffness to be set to a low value whilst simultaneously obtaining a long service life of the elastic connecting element.

The elastic connecting element made from rubber elastic material is preferably vulcanized onto the first axial end face of the fixed gear and onto the second axial end face of the idler, thereby enabling correspondingly good adhesion of the elastic connecting element to the end faces and in turn a higher service life to be achieved.

Based on another embodiment of the gear assembly, the idler may be biased in the circumferential direction against the fixed gear, as a result of which the function of reducing the tooth flank clearance on meshing with the teeth of the other gears of the gear drive can be imparted to the gear assembly in addition. The clearance free positioning is also assisted by the elastic connecting element.

Furthermore, the elastic connecting element may have a cross-section that becomes wider in the direction towards the first axial end face of the fixed gear and/or in the direction towards the second axial end face of the idler. This enables a low radial stiffness of the connecting element and at the same time a high bonding strength on the end faces to be obtained especially if the elastic connecting element is at least partially made from a rubber that is vulcanized on.

Based on another embodiment of the gear drive, the fixed gear is positioned against the second gear of the balance shaft and the idler is positioned against the first gear of the crankshaft, thereby enabling positioning of the gear assembly on both gears to be improved.

To provide a clearer understanding, the invention will be described in more detail below with reference to the appended drawings.

These are highly simplified, schematic diagrams, respectively illustrating:

FIG. 1 a front view of a gear drive;

FIG. 2 a detail of a preferred embodiment of a gear assembly in cross-section;

FIG. 3 a detail of another embodiment of the gear assembly in a front view.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 provides a schematic illustration of a gear drive 1. The gear drive 1 comprises a crankshaft 2 on which a first gear 3 is mounted so as to rotate in unison therewith. The first gear 3 has a first toothing 4. The latter is disposed on a radially outer circumference of the first gear 3.

It should be pointed out that all of the gears of the gear drive 1 are preferably provided with radial teeth disposed or arranged on the outer circumference of the respective gear. For the sake of simplicity, the latter are illustrated as annuli in FIG. 1.

The gear drive 1 further comprises at least one balance shaft 5 on which a second gear 6 is mounted so as rotate in unison therewith. The second gear 6 has a second toothing 7. The latter is disposed on a radially outer circumference of the second gear 6.

In the embodiment of the gear drive 1 illustrated, two balance shafts 4 are provided, each having a second gear 5. However, it would also be possible to provide only one balance shaft 4 with the second gear 5.

Disposed between the first gear 3 and second gear 6 is an idler gear 8. The toothing of the idler gear 8 meshes with the first toothing 4 of the first gear 3 of the crankshaft 2 and the second toothing 7 of the second gear 6 of the balance shaft 5. Unlike the first gear 3 and second gear 6, the idler gear 8 is not disposed on a shaft but is mounted on an axle 9 by means of a bearing 10, for example a roller bearing. The axle 9 is connected in a non-rotating manner to an engine block 11, for example.

The idler gear 8 is provided in the form of a gear assembly 12, which can be seen more clearly from FIG. 2 illustrating a detail of a preferred embodiment of the gear assembly 12 in cross-section.

The gear assembly 12 comprises a fixed gear 13 (or first part-gear) and an idler 14 for second part-gear). The fixed gear 2 is mounted on the axle 9 by means of the bearing 10. The fixed gear 2 preferably has a hub part 15 adjoining the bearing 10 towards the outside in the radial direction, on which the idler 14 is rotatably mounted.

On its radially outer circumference, the fixed gear 13 has a first radial toothing 16. On its outer circumference, the idler 14 also has a second radial toothing 17. The first radial toothing 16 of the fixed gear 13 and the second radial toothing 17 of the idler 14 are preferably at least approximately, in particular exactly, disposed or arranged at the same radial height, as may be seen from FIG. 2. The idler gear 8 of the gear drive 1 is therefore provided in the form of a split gear.

The fixed gear 13 has a first axial end face 18. The idler 14 has a second axial end face 19. When the gear assembly 12 is in the assembled state, the first axial end face 18 of the fixed gear 13 and the second axial end face 19 of the idler 14 are disposed adjacent to one another.

The first axial end face 18 of the fixed gear 13 is preferably disposed in a recess 20, in particular of a circular shape, in particular a groove-shaped recess 20 of the fixed gear 13. As an alternative or in addition, however, the second axial end face 19 of the idler 14 may also be disposed in a recess of the idler 14 (not illustrated in FIG. 2).

It would naturally also be possible for the fixed gear 13 and/or the idler 14 to be based on a design without such recesses 20, as illustrated in the case of the idler 14 in FIG. 2.

Disposed between the first axial end face 18 of the fixed gear 13 and the second axial end face 19 of the idler 14 is at least one elastic connecting element 21. The fixed gear 13 is connected to the idler 14 by means of this elastic connecting element 21. To this end, the elastic connecting element 21 is connected on the one hand to the first axial end face 18 of the fixed gear 13 and on the other hand to the second axial end face of the idler 14.

In principle, the elastic connecting element 21 may be any element which has sufficient elastic properties, such as for example at least one spring, in particular a helical spring, in which case several such elastic connecting elements 21 are preferably distributed around the circumference of the gear assembly, in particular uniformly.

Based on the preferred embodiment, however, the elastic connecting element 21 is at least partially made from at least one rubber elastic material, in particular at least one rubber.

For example, the elastic connecting element 21 may be made at least partially from an (X)NBR ((carboxylated) acrylonitrile butadiene rubber), HNBR (hydrated nitrile rubber), a silicone rubber (VMQ), NR (natural rubber), EPDM (ethylene propylene diene rubber), CR (chloroprene rubber), SBR (styrene butadiene rubber) etc., and mixtures of these materials may also be used. For example, the elastic connecting element 21 may comprise at least two connecting element parts made from different elastic materials that are connected to one an other in particular.

By "at least partially" is meant that fixing elements or stiffening elements for example, such as fibers and/or yarns, for example made from metal, plastic, natural fibers, etc or rods, may be embedded in the elastic connecting element 21. However, the elastic connecting element 21 is preferably made exclusively from a rubber elastic material.

The elastic connecting element 21 may be connected to the first axial end face 18 of the fixed gear 12 and to the second axial end face 19 of the idler 14 by a bonded connection or by mechanical connections for example, for which purpose at least one (metal) fixing element may be provided in or on the elastic connecting element 21. However, the elastic connecting element 21 is preferably connected to the first axial end face 18 of the fixed gear 12 and to the second axial end face 19 of the idler 14 by directly vulcanizing the elastic connecting element 21 to the latter if it is made from at least one rubber elastic material or a precursor thereof.

In order to improve adhesion of the at least one elastic connecting element 21, at least one groove-shaped recess 22 may be provided in the first axial end face 18 of the fixed gear 13 and/or in the second axial end face 19 of the idler 14, as indicated by broken lines in FIG. 2. This groove-shaped recess 22 may be provided in discrete regions only, i.e. not around the entire circumference or as an annular groove. This at least one groove-shaped recess 22 preferably has an undercut. For example, it may have a cross-section with a dove, tail shape as viewed in the direction perpendicular to the axial direction of the gear assembly 12.

As already mentioned, at least one elastic connecting element 21 is provided. The latter is preferably annular or disk-shaped and may also be described as a disk spring—by contrast with the sleeve spring specified above. However, it would also be possible to provide several elastic connecting elements 21 extending around only a part-region of the circumference of the gear assembly 12. In this case, the elastic connecting elements 21 are distributed at the same distance from one another around the circumference of the gear assembly 12.

It is also possible for the at least one elastic connecting element 21 to be disposed in the gear assembly 12 so that it extends as far as a radial end face. Based on the preferred embodiment of the gear assembly 12, however, the at least one elastic connecting element 21 is disposed exclusively between the first axial end face 18 of the fixed gear 13 and the second axial end face 19 of the idler 14 and is connected exclusively to these axial end faces 18, 19, as illustrated in FIG. 2.

FIG. 3 shows a detail from another embodiment of the gear assembly 12 which may also be construed as an independent embodiment in its own right, the same reference numbers being used for parts that are the same as those described with reference to FIG. 2 and the same component names as those described with reference to FIG. 2. To avoid unnecessary repetition, reference may be made to the more detailed description of FIG. 2 above.

Based on this embodiment of the gear assembly 12, the idler 14 is biased in the circumferential direction of the gear assembly 12 towards the fixed gear 13. As a result, the first radial toothing 16 of the fixed gear 13 is offset or turned in the circumferential direction of the gear assembly 12 relative to the second radial toothing of the idler 14 by a specific or pre-definable angular amount. This results in a so-called split gear, enabling backlash-free engagement in another toothing of another gear, for example the first gear 3 and/or the second gear 6 of the gear drive 1 (FIG. 1). This can be achieved by turning the idler 14 in the circumferential direction of the gear assembly relative to the fixed gear 13 before fitting and/or vulcanizing the at least one elastic connecting element 21, and fixing it in this position by means of a pin or such like, which is then removed again after fitting the gear assembly 12 in a or in the gear drive 1.

Based on another embodiment of the gear assembly 12, the elastic connecting element 21 may have a cross-section that becomes wider in the direction towards the first axial end face 18 of the fixed gear 13 and/or in the direction towards the second axial end face 19 of the idler 14, as illustrated in FIG. 2. A middle region 23 of the elastic connecting element may therefore have the smallest cross-section as viewed in the direction perpendicular to the axial direction of the gear assembly 12.

In this respect, it is of advantage if the region of the elastic connecting element 21 directly adjoining the first axial end face 18 of the fixed gear 13 and/or the region directly adjoining the second axial end face 19 of the idler 14 is or are provided with a curvature 24, thereby enabling the mechanical load-bearing capacity of the elastic connecting element 21 to be improved. In particular, this curvature may be provided with a convex curvature relative to the elastic connecting element 21, as illustrated in FIG. 2.

The toothing of the gears of the gear drive 1 and hence also the gear assembly 12 may generally be provided in the form of straight teeth or as straight helical teeth. The gear drive 1 may also be described as a spur gear drive.

Furthermore, the toothing of the fixed gear 13 and the toothing of the idler 14 may be of the same or a mutually different axial width.

As explained above, the toothing of the idler gear 8, in other words the gear assembly 12, may be positioned against the first gear 3, i.e. the first toothing 4 thereof and/or against the second gear 6, i.e. the second toothing 7 thereof, of the gear drive 1 (FIG. 1). Based on one embodiment of the gear drive 1, the fixed gear 13 is positioned against the second gear 6 of the balance shaft 5 and the idler 14 against the first gear 4 of the crankshaft 2 of the gear drive 1.

The embodiments illustrate possible examples of embodiments, and it should be pointed out at this stage that combinations of the individual embodiments with one another are also possible.

For the sake of good order, finally, it should be noted that in order to provide a clearer understanding of the structure of the gear drive 1 and gear assembly 12, they and their constituent parts are illustrated to a certain extent out of scale and/or on a larger scale and/or on a smaller scale.

LIST OF REFERENCE NUMBERS

1 Gear drive
2 Crankshaft
3 Gear
4 Toothing
5 Balance shaft
6 Gear

7 Toothing
8 Idler gear
9 Axle
10 Bearing
11 Engine block
12 Gear assembly
13 Fixed gear
14 Idler
15 Hub part
16 Radial toothing
17 Radial toothing
18 End face
19 End face
20 Recess
21 Connecting element
22 Recess
23 Middle region
24 Curvature

The invention claimed is:

1. Gear assembly comprising a fixed gear having a first radial toothing and
an idler having a second radial toothing,
the first radial toothing being disposed at the same radial height as the second radial toothing, and
the fixed gear further comprises a first axial end face and the idler comprises a second axial end face,
wherein the fixed gear is connected to the idler by at least one elastic connecting element,
wherein the elastic connecting element is connected to the fixed gear at the first axial end face and to the idler at the second axial end face, and
wherein the elastic connecting element is at least partially made from a rubber elastic material and vulcanized or connected by a bonded connection onto the first axial end face of the fixed gear and onto the second axial end face of the idler.

2. Gear assembly according to claim 1, wherein the elastic connecting element is disposed exclusively between the first axial end face of the fixed gear and the second axial end face of the idler and is connected exclusively to these axial end faces.

3. Gear assembly according to claim 1, wherein the first axial end face of the fixed gear is disposed in a recess of the fixed gear and/or the second axial end face of the idler is disposed in a recess of the idler.

4. Gear assembly according to claim 1, wherein the idler is biased in the circumferential direction towards the fixed gear.

5. Gear assembly according to claim 1, wherein the elastic connecting element has a cross-section that becomes wider in the direction towards the first axial end face of the fixed gear and/or in the direction towards the second axial end face of the idler.

6. Gear drive comprising a crankshaft having a first gear and a balance shaft having a second gear, and an idler gear is disposed between the first gear and the second gear which meshes with the first and the second gear, wherein the idler gear is a gear assembly according to claim 1 comprising a fixed gear and an idler.

7. Gear drive according to claim 6, wherein the fixed gear is positioned exclusively against the second gear of the balance shaft and the idler is positioned exclusively against the first gear of the crankshaft.

* * * * *